US009665939B2

(12) United States Patent
Nakayama (10) Patent No.: US 9,665,939 B2
(45) Date of Patent: May 30, 2017

(54) IMAGE PROCESSING APPARATUS, CONTROL METHOD, AND RECORDING MEDIUM

(71) Applicant: CANON KABUSHIKI KAISHA, Tokyo (JP)

(72) Inventor: Fumitaka Nakayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 28 days.

(21) Appl. No.: 14/676,204

(22) Filed: Apr. 1, 2015

(65) Prior Publication Data

US 2015/0286899 A1   Oct. 8, 2015

(30) Foreign Application Priority Data

Apr. 4, 2014   (JP) ................................ 2014-078235

(51) Int. Cl.
*G06T 7/00*   (2006.01)
*H04N 5/232*   (2006.01)
(Continued)

(52) U.S. Cl.
CPC .......... *G06T 7/0051* (2013.01); *G06T 3/0093* (2013.01); *G06T 7/11* (2017.01);
(Continued)

(58) Field of Classification Search
None
See application file for complete search history.

(56) References Cited

U.S. PATENT DOCUMENTS 5,966,129 A * 10/1999 Matsukuma ............ G06T 13/20
345/418
6,263,100 B1 * 7/2001 Oshino .................. G06K 9/209
382/154
(Continued)

FOREIGN PATENT DOCUMENTS

| JP | 11-027577 A | 1/1999 |
| JP | 2010-011441 A | 1/2010 |
| JP | 2012-004716 A | 1/2012 |

OTHER PUBLICATIONS

The above references were cited in a Dec. 14, 2016 Korean Office Action, which is enclosed without English Translation, that issued in Korean Patent Application No. 10-2015-0048140.

*Primary Examiner* — Utpal Shah
(74) *Attorney, Agent, or Firm* — Cowan, Liebowitz & Latman, P.C.

(57) ABSTRACT

An image processing apparatus obtains an input image acquired by image capturing, and classifies the input image into a main subject region and a background region. The image processing apparatus determines virtual image capturing conditions corresponding to an output image to be generated, based on the positional relationship between a main subject and a background subject in an image capturing environment when the input image was captured. The image processing apparatus deforms, of the input image, an image classified into the background region, and generates a background image of the output image that corresponds to the determined virtual image capturing conditions. The image processing apparatus composes, of the input image, an image classified into the main subject region and the background image, thereby generating the output image.

13 Claims, 6 Drawing Sheets

(51) Int. Cl.
  *G06T 3/00* (2006.01)
  *G06T 7/11* (2017.01)
  *G06T 7/194* (2017.01)

(52) U.S. Cl.
  CPC ......... *H04N 5/23222* (2013.01); *G06T 7/194* (2017.01); *G06T 2207/20212* (2013.01); *G06T 2207/20221* (2013.01)

(56) References Cited

U.S. PATENT DOCUMENTS

| | | | |
|---|---|---|---|
| 9,330,334 B2* | 5/2016 | Lin | G06K 9/4671 |
| 2003/0007204 A1* | 1/2003 | Ashizaki | G03H 1/268 |
| | | | 359/23 |
| 2009/0116732 A1* | 5/2009 | Zhou | H04N 13/0029 |
| | | | 382/154 |
| 2010/0266207 A1* | 10/2010 | Zhang | G06T 5/003 |
| | | | 382/195 |
| 2011/0157424 A1* | 6/2011 | Makino | G06T 7/0081 |
| | | | 348/231.99 |
| 2012/0163712 A1* | 6/2012 | Nakajima | G06T 7/0081 |
| | | | 382/165 |
| 2012/0293693 A1* | 11/2012 | Sumitomo | H04N 13/0264 |
| | | | 348/246 |
| 2014/0056473 A1* | 2/2014 | Tojo | G06K 9/3241 |
| | | | 382/103 |
| 2014/0240553 A1* | 8/2014 | Pylvanainen | H04N 5/2628 |
| | | | 348/240.2 |
| 2015/0173846 A1* | 6/2015 | Schneider | A61B 1/00009 |
| | | | 600/424 |
| 2016/0086381 A1* | 3/2016 | Jung | G06K 9/6201 |
| | | | 345/633 |

\* cited by examiner

IMAGE PROCESSING APPARATUS, CONTROL METHOD, AND RECORDING MEDIUM

BACKGROUND OF THE INVENTION

Field of the Invention

The present invention relates to an image processing apparatus, a control method, and a recording medium, and particularly to a technique of generating an image under different image capturing conditions from an image obtained by image capturing.

Description of the Related Art

Recently, an image obtained by image capturing using an image capturing apparatus such as a digital camera is constituted as digital data. An information processing apparatus such as a PC can apply various image processes to process the image into a desired image. Japanese Patent Laid-Open No. 11-27577 discloses an image system in which a human subject is extracted from an image captured at one viewpoint, enlarged, and superposed on a background image captured at a different viewpoint, thereby generating an image as if it were captured at a different position.

However, an image generated by the image system in Japanese Patent Laid-Open No. 11-27577 is obtained by virtually generating an image in a positional relationship different from the positional relationship between an actually captured subject and background. When conditions such as ambient light are different, an unnatural image is highly likely to be generated.

SUMMARY OF THE INVENTION

The present invention was made in view of such problems in the conventional technique. The present invention provides an image processing apparatus, control method, and recording medium for generating, from an image obtained by image capturing, an image under virtual image capturing conditions different from those at the time of image capturing while maintaining the positional relationship between a main subject and a background subject.

The present invention in its first aspect provides an image processing apparatus comprising: an obtaining unit configured to obtain an input image acquired by image capturing; a classification unit configured to classify the input image obtained by the obtaining unit into a main subject region and a background region; a determination unit configured to determine virtual image capturing conditions corresponding to an output image to be generated, based on a positional relationship between a main subject and a subject of the background region in an image capturing environment when the input image was captured; a generation unit configured to deform, of the input image, an image classified into the background region, and generate a background image of the output image that corresponds to the virtual image capturing conditions determined by the determination unit; and a composition unit configured to compose, of the input image, an image classified into the main subject region, and the background image generated by the generation unit, thereby generating the output image.

The present invention in its second aspect provides a control method of an image processing apparatus comprising: an obtaining step of obtaining an input image acquired by image capturing; a classification step of classifying the input image obtained in the obtaining step into a main subject region and a background region; a determination step of determining virtual image capturing conditions corresponding to an output image to be generated, based on a positional relationship between a main subject and a subject of the background region in an image capturing environment when the input image was captured; a generation step of deforming, of the input image, an image classified into the background region, and generating a background image of the output image that corresponds to the virtual image capturing conditions determined in the determination step; and a composition step of composing, of the input image, an image classified into the main subject region, and the background image generated in the generation step, thereby generating the output image.

Further features of the present invention will become apparent from the following description of exemplary embodiments (with reference to the attached drawings).

DESCRIPTION OF THE EMBODIMENTS

Embodiment

An exemplary embodiment of the present invention will now be described in detail with reference to the accompanying drawings. An embodiment described below will explain an example in which the present invention is applied to, as an example of an image processing apparatus, a PC capable of generating an image under different image capturing conditions from an image obtained by image capturing. However, the present invention is applicable to an arbitrary device capable of generating an image under different image capturing conditions from an image obtained by image capturing.

<<Output Image to be Generated>>

The constitution of an image (output image) to be generated from an image (input image) obtained by image capturing in the PC according to this embodiment will be explained. In this embodiment, an image obtained by a so-called dolly zoom from an input image is generated as an example of an output image corresponding to virtual image capturing conditions different from image capturing conditions at the time of image capturing while maintaining the positional relationship between a main subject and a background subject in an image capturing environment when an input image was captured.

The "dolly zoom" is an image capturing method of changing the focal distance while moving an image capturing apparatus toward (dolly in) or apart from (dolly out) a subject, thereby producing an effect as if only the background were expanded or contracted while maintaining the position and size of a main subject in an image. More specifically, when image capturing is performed during dolly in, the focal distance is decreased to shift the focus to the wide angle-side in such a way as to maintain the position and size of a main subject, thereby implementing the dolly zoom. When image capturing is performed during dolly out, the focal distance is increased to shift the focus to the telephoto-side in such a way as to maintain the position and size of a main subject, thereby implementing the dolly zoom.

However, the dolly zoom image capturing requires a physical space capable of moving the image capturing apparatus in the optical axis direction, and an image capturing optical system capable of setting a focal distance corresponding to the moving amount. That is, when it is difficult to hold and move the image capturing apparatus at an image capturing site, or the image capturing optical system does not cope with a corresponding focal distance, the dolly zoom image capturing cannot be performed. In this embodiment, to enable pseudo dolly zoom image capturing, image processing accompanied by deformation is applied to an input image to generate an output image in a relationship of the dolly zoom (hereinafter, "dolly zoom relationship"). An output image in the dolly zoom relationship with an input image will be referred to as a "dolly zoom image" and be explained.

<<Arrangement Regarding Image Processing>>

Figure 1:
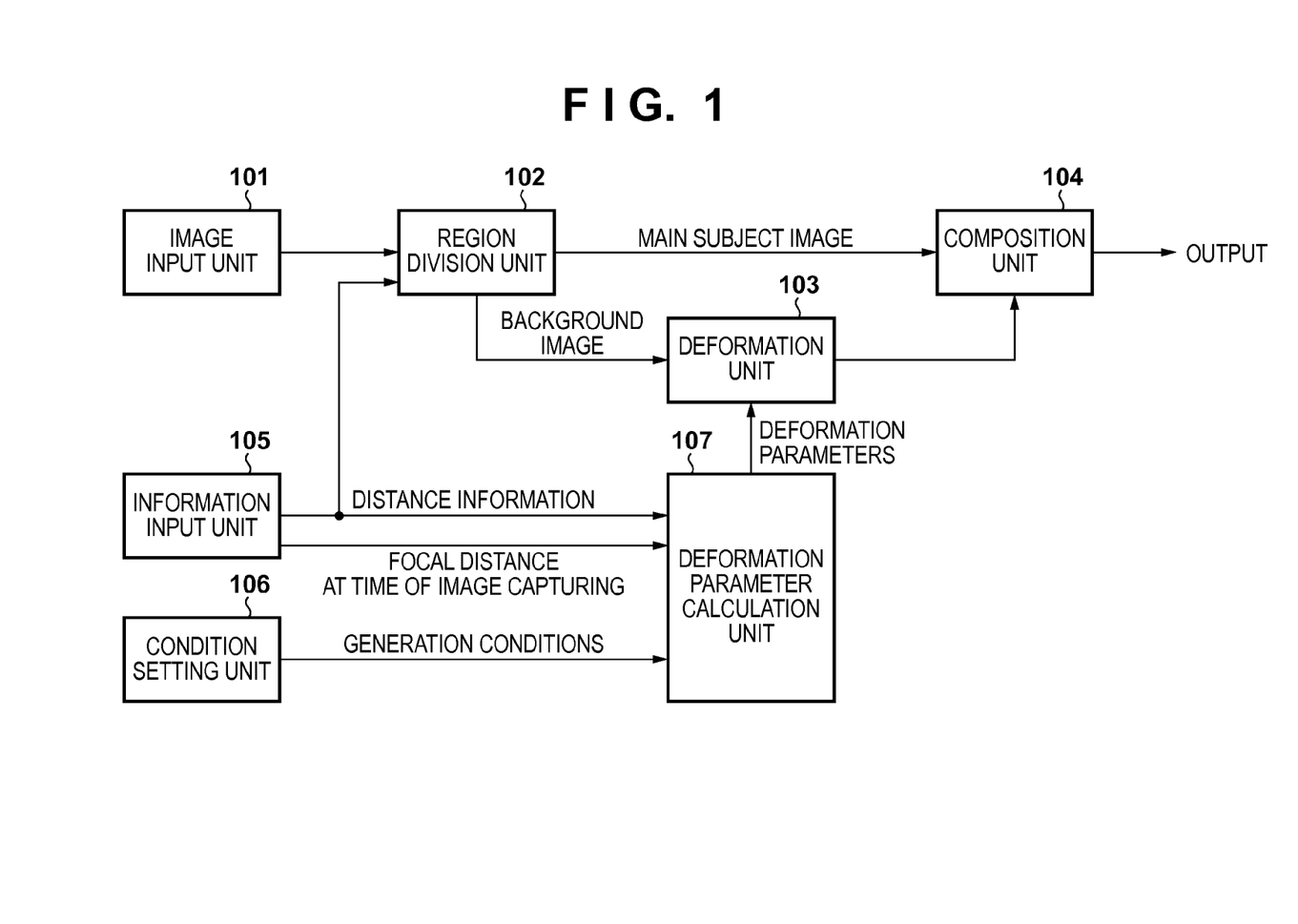
FIG. 1 is a block diagram showing a functional arrangement regarding image processing of generating a dolly zoom image according to an embodiment of the present invention.

FIG. 1 is a block diagram showing a functional arrangement regarding image processing of generating a dolly zoom image, out of the functional arrangement of a PC 100 according to the embodiment of the present invention. Each block to be described below will be explained as each module regarding image processing that is implemented by, for example, extracting a corresponding application program recorded in a recording device such as an HDD to a RAM or the like and executing it by the control unit (not shown) of the PC 100. However, the image processing in the practice of the present invention is not limited to one implemented by a program, and may be one in which the operation is implemented by hardware such as an information processing circuit having a function corresponding to one or more modules.

Figure 3A:
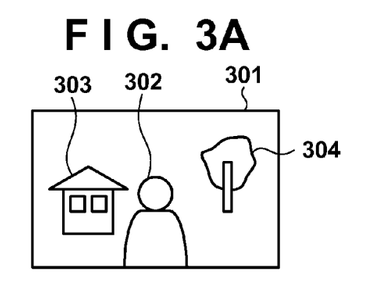
FIGS. 3A, 3B, 3C, 3D, 3E, and 3F are views for explaining an input image and a dolly zoom image according to the embodiment of the present invention.

An image input unit 101 obtains, as an input image, an image captured by an image capturing apparatus. In the following description, an input image 301 will be explained as an image shown in FIG. 3A that is obtained by capturing an image of a subject in a positional relationship as shown in FIG. 3C. As shown in FIG. 3C, a main subject 322, building 323, and tree 324 at different distances from an image capturing apparatus 321 are arranged in the optical axis direction (depth direction) of the image capturing apparatus 321. To simplify the description, this embodiment assumes that there is no subject far from the tree 324 and a background of a uniform color exists. In this embodiment, the main subject 322 positioned at the center of the angle of view is selected as a main subject in order to generate a dolly zoom image.

An information input unit 105 obtains pieces of information of image capturing conditions when the input image 301 was captured. This embodiment assumes that the pieces of information of image capturing conditions include information of the focal distance of the image capturing optical system that has been set in the image capturing apparatus at least at the time of image capturing, and information (distance information) of the distance between the image capturing apparatus and each subject captured in the angle of view of image capturing. In the case of the input image 301, the distance information includes $S_{w1}$ for the main subject 322, $S_{w2}$ for the building 323, and $S_{w3}$ for the tree 324 as distances from the image capturing apparatus 321, as shown in FIG. 3C. When an image sensor configured to record a pupil division image is used, the distance between each subject and the image capturing apparatus 321 may be calculated based on a defocus amount obtained by correlation calculation of images corresponding to two pupil division regions. A defocus amount obtained by correlation calculation of a plurality of images captured while changing the focus position may be used, or a defocus amount obtained by correlation calculation of images simultaneously captured at a plurality of positions may be used. The information input unit 105 outputs, to a region division unit 102, distance information out of the obtained pieces of information of image capturing conditions at the time of image capturing. Also, the information input unit 105 outputs, to a deformation parameter calculation unit 107 (to be described later), distance information and focal distance information out of the pieces of information of image capturing conditions at the time of image capturing.

The region division unit 102 generates images by dividing the input image 301 into a main subject region and the remaining background region based on the distance information input from the information input unit 105. Especially when background subjects exist at a plurality of different distances in the background region, as in this embodiment, the region division unit 102 generates images by separating, for respective depth ranges, background subjects that are included in the background region and correspond to different depth ranges. More specifically, the region division unit 102 divides the input image 301 into a main subject image 331 as shown in FIG. 3D, a background image 332*a* corresponding to the building 323 and a background image 332*b* corresponding to the tree 324 as shown in FIG. 3E, and a background image corresponding to the remaining background. The main subject image 331 and the background images 332*a* and 332*b* divided by the region division unit 102 are output to a composition unit 104 and a deformation unit 103, respectively.

To simplify the description, this embodiment will explain that the input image 301 is "divided". However, the input image 301 need not always be divided in the practice of the present invention. In image processing according to this embodiment, it is only necessary to separate the input image 301 into a main subject image, and a background region or the regions of respective background subjects in the background region. Thus, the region division unit 102 may be configured to add, to each pixel of the input image 301 or each region of a predetermined size, information representing "classification" into either the main subject region or the background region. An image may be divided using not only distance information but also a feature amount or the like regarding a specific background subject. In the above description, the image of a background region is divided into a plurality of background images in accordance with distances from the image capturing apparatus. However, the present invention can be practiced without separating the image of a background region into the ranges of respective distances from the image capturing apparatus. In the case of division into a plurality of background images in accordance with distances, for example, even if occlusion is generated between background subjects by enlargement of an image, it can be easily coped with.

Figure 6A:
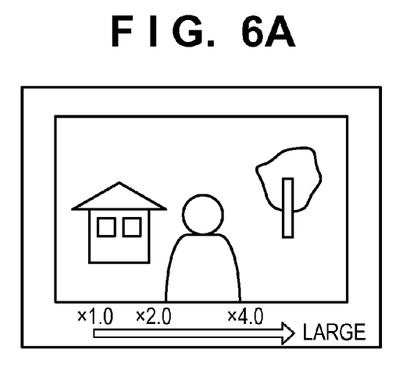
FIGS. 6A and 6B are views for explaining examples of a user interface for changing the enlargement ratio of a predetermined subject in a dolly zoom image according to the embodiment of the present invention.
Figure 6B:
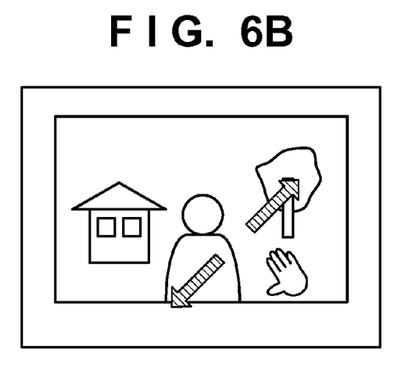

A condition setting unit 106 obtains condition information representing conditions regarding a dolly zoom image to be generated, and outputs it to the deformation parameter calculation unit 107. In this embodiment, the condition setting unit 106 obtains, from a user input or the like, information representing an amount in which the size of the image of a background subject at a deepest position in the background region of the input image 301 is changed in the dolly zoom image. More specifically, the condition setting unit 106 obtains enlargement ratio information representing the ratio (enlargement ratio) of a size in the input image 301 and a size in the dolly zoom image for the image of the tree 324 serving as a background subject at a deepest position. This embodiment will explain that the enlargement ratio information is set by a user input, but the practice of the present invention is not limited to this. For example, pieces of enlargement ratio information may be sequentially obtained from a predetermined enlargement ratio list. A background subject for which the enlargement ratio is designated is not limited to a subject at a deepest position, and the designation target may be a background subject selected from the background region by a predetermined method. The method of designating an enlargement ratio may be implemented by, for example, an operation input to a slide bar complying with a GUI screen as shown in FIG. 6A. Alternatively, for example, when the input image 301 is displayed on a display device including a sensor configured to detect a touch input, this method may be implemented by a so-called pinch-in/out operation of changing the interval between two touch input points as shown in FIG. 6B.

Based on the input focal distance information, distance information, and enlargement ratio information, the deformation parameter calculation unit 107 calculates deformation parameters for deforming the respective background images 332a and 332b for a dolly zoom image. The deformation parameter calculation method will be described later together with a dolly zoom image generation principle. The deformation parameter calculation unit 107 sequentially outputs the calculated deformation parameters to the deformation unit 103.

Figure 3B:
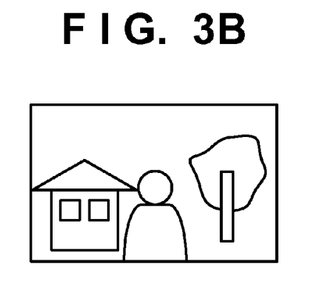
Figure 3C:
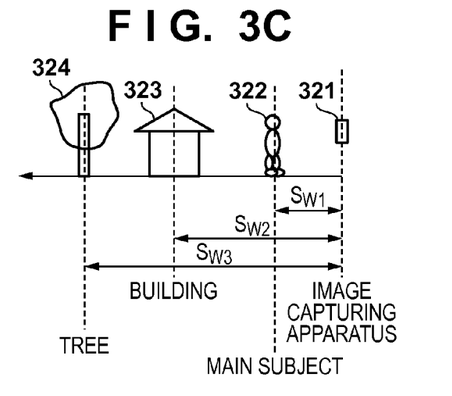
Figure 3D:
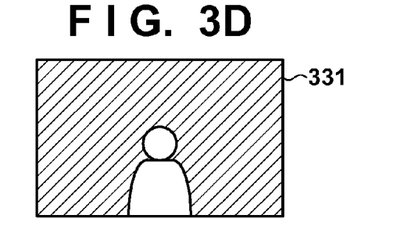
Figure 3E:
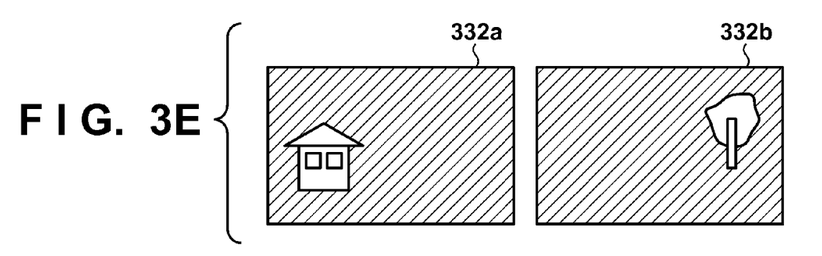
Figure 3F:
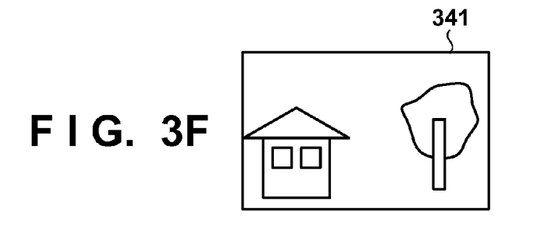

The deformation unit 103 deforms the respective background images 332a and 332b in accordance with the input deformation parameters, generating a deformed background image 341 for a dolly zoom image, as shown in FIG. 3F. The deformation for generating the deformed background image 341 is performed to hold the positional relationship between the main subject and the background subjects in the image capturing environment at the time of capturing the input image 301. Thus, the deformed background image 341 is generated by changing the enlargement ratio of each background subject in accordance with a distance to the image capturing apparatus 321.

The composition unit 104 composes the input main subject image 331 and the deformed background image 341, generating and outputting a dolly zoom image as shown in FIG. 3B. More specifically, the composition unit 104 performs so-called overlay composition by superposing the main subject image 331 on the deformed background image 341 so that the position and size of the main subject image 331 in the image become the same as those in the input image 301. As will be described later, a focal distance different from that at the time of capturing the input image 301 is virtually set in dolly zoom image generation processing. To represent a change of the focus state along with a change of the focal distance, that is, to represent a state in which the depth of field becomes shallow when the focal distance becomes long, the composition unit 104 may apply a low-pass filter to the deformed background image 341. In this case, the filter intensity suffices to be set based on the distance ratio of a main subject and a background subject so as to blur much more the image of a background subject more distant from the main subject. In order to make less conspicuous a step at the boundary between a main subject region and a background region in the dolly zoom image, the composition unit 104 may perform not overlay composition in the peripheral region of the boundary of the main subject region, but weighted addition composition of the main subject image 331 and deformed background image 341. Alternatively, the composition unit 104 may compose the main subject image 331 and the deformed background image 341 by setting a filter coefficient of 0 for the pixels of the main subject image 331 and performing filter processing.

<<Dolly Zoom Image Generation Principle>>

The dolly zoom image generation principle regarding calculation of deformation parameters in the deformation parameter calculation unit 107 will be explained in detail with reference to the accompanying drawings.

First, when the relationship between a three-dimensional coordinate system centered on the image capturing apparatus, a normalized image coordinate system, and an image coordinate system when the image capturing apparatus is a pinhole camera is used, $$\begin{pmatrix} x \\ y \\ w \end{pmatrix} = \begin{pmatrix} f_x & 0 & c_x \\ 0 & f_y & c_y \\ 0 & 0 & 1 \end{pmatrix} \begin{pmatrix} r_{11} & r_{12} & r_{13} & t_1 \\ r_{21} & r_{22} & r_{23} & t_2 \\ r_{31} & r_{32} & r_{33} & t_3 \end{pmatrix} \begin{pmatrix} X \\ Y \\ Z \\ 1 \end{pmatrix} \quad (1)$$

$$\begin{pmatrix} x' \\ y' \end{pmatrix} = \frac{1}{w} \begin{pmatrix} x \\ y \end{pmatrix} \quad (2)$$

is established.

In these equations, (x,y) are coordinates when an arbitrary subject is projected onto the normalized image coordinate plane, and (x',y') are coordinates when the arbitrary subject is projected onto an image coordinate plane obtained by image capturing. $f_x$ and $f_y$ are focal distances that are set at the time of transformation into an image coordinate system and are represented by pixels along the x'-axis and y'-axis. Also, $f_x$ and $f_y$ are values obtained by dividing the set focal distances by the pixel pitches of the image sensor in the horizontal and vertical directions, respectively. $c_x$ and $c_y$ are equivalent to the coordinates of the center of an image when the upper left corner of the image is defined as an origin (0, 0). $r_{lm}$ is each component of a rotation matrix representing the rotation of the image capturing apparatus, and $t_n$ is each component of the moving amount in the three-dimensional coordinate system centered on the image capturing apparatus, and represents the translation of the image capturing apparatus. In this embodiment, the input image 301 and the dolly zoom image have a relationship in which they are captured by translating the image capturing apparatus only in the optical axis direction without rotation. That is, when the orientation and position of the image capturing apparatus at the time of capturing the input image 301 are set as a reference, the center matrix in equation (1) corresponding to the time of image capturing is:

$$\begin{pmatrix} 1 & 0 & 0 & 0 \\ 0 & 1 & 0 & 0 \\ 0 & 0 & 1 & 0 \end{pmatrix}$$

the center matrix in equation (1) when virtually capturing the dolly zoom image is:

$$\begin{pmatrix} 1 & 0 & 0 & 0 \\ 0 & 1 & 0 & 0 \\ 0 & 0 & 1 & t_3 \end{pmatrix}$$

Hence, w is Z at the time of image capturing, and $Z+t_3$ at the time of generating a dolly zoom image. Note that (X,Y,Z) is a projection of a captured image to the three-dimensional coordinate system, and is calculated by:

$$\begin{pmatrix} X \\ Y \\ Z \end{pmatrix} = \begin{pmatrix} (u - c_{x0})\dfrac{d}{f_{x0}} \\ (v - c_{y0})\dfrac{d}{f_{y0}} \\ d \end{pmatrix}$$

where (u,v) are the coordinates of a subject in a captured image, d is distance information, $f_{x0}$ and $f_{y0}$ are focal distances set at the time of image capturing, and $c_{x0}$ and $c_{y0}$ are the coordinates of the center of an image when the upper left corner of the image is defined as an origin (0, 0). Note that $f_{x0}$ and $f_{y0}$ are values obtained by dividing focal distances set at the time of image capturing by the pixel pitches of the image sensor in the horizontal and vertical directions, respectively, and d is a value obtained by division by a diagonal pixel pitch.

The position and size of the image of a main subject in the dolly zoom image are the same as those in the input image 301, so the following relation is established. For simplicity, a case will be explained, in which one main subject and one subject (background subject) of the background exist in a positional relationship as shown in FIG. 4 at the time of image capturing.

Figure 4:
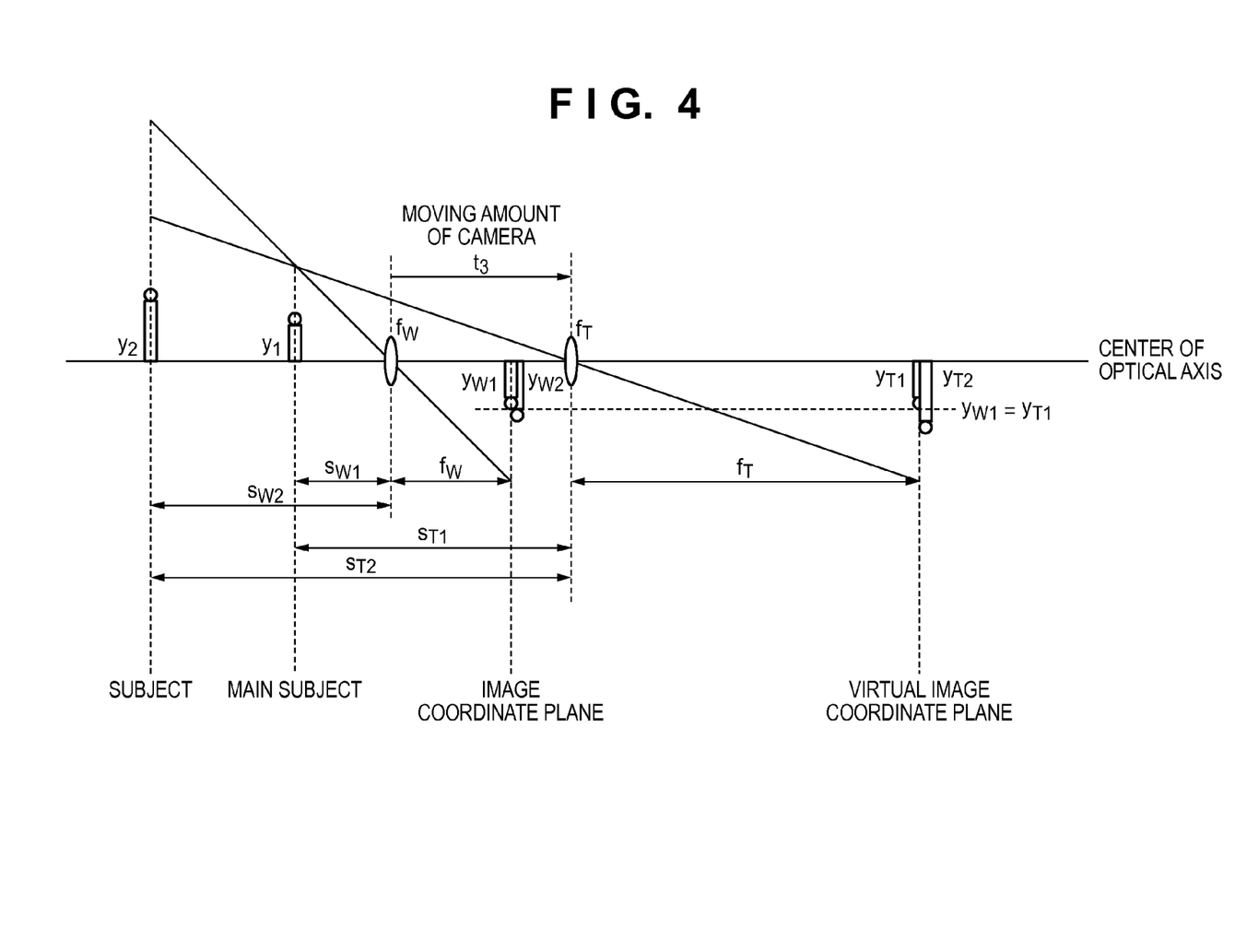
FIG. 4 is a view for explaining a dolly zoom image generation principle according to the embodiment of the present invention.

The example of FIG. 4 indicates a situation in which a main subject of a height $y_1$ present at a position spaced apart from the image capturing apparatus by a distance $s_{w1}$, and a background subject of a height $y_2$ present at a position spaced apart from the image capturing apparatus by a distance $s_{w2}$ are captured at a focal distance $f_w$. Assume that the input image 301 is obtained by this image capturing. Also, assume that the image of the main subject and the image of the background subject are projected at the heights $y_{w1}$ and $y_{w2}$, respectively, on an image coordinate plane that is an imaging plane corresponding to the input image 301 and is positioned at the focal distance $f_w$ from the image capturing optical system.

A case will be examined, in which a position of the image capturing apparatus dollied out backward by $t_3$ is set as a virtual image capturing position when generating (virtually capturing) a dolly zoom image from an image captured at this time. A height $y_{T1}$ of the image of the main subject on a virtual image coordinate plane corresponding to the dolly zoom image coincides with the height $y_{w1}$ of the image on the image coordinate plane corresponding to the input image 301. The image capturing conditions of virtual image capturing at this time are a virtual focal distance $f_T$, a distance $s_{T1}$ from the image capturing apparatus to the main subject, and a distance $s_{T2}$ to the background subject. Further, $y_{T2}$ is the height of the image of the background subject on the virtual image coordinate plane.

First, in the relationship of a projection of the background subject to the image coordinate plane or the virtual image coordinate plane at the time of image capturing or the time of virtual image capturing, $$\frac{y_{w2}}{f_w} = \frac{y_2}{s_{w2}}$$

$$\frac{y_{T2}}{f_T} = \frac{y_2}{s_{T2}} = \frac{y_2}{s_{T1} + (s_{w2} - s_{w1})}$$

are established. Eliminating $y_2$ from these two equations yields:

$$\frac{y_{T2}}{y_{w2}} = \frac{f_T}{f_w} \frac{s_{w2}}{s_{T1} + (s_{w2} - s_{w1})} \tag{3}$$

As for even the main subject, $$\frac{y_{w1}}{f_w} = \frac{y_1}{s_{w1}}$$

$$\frac{y_{T1}}{f_T} = \frac{y_1}{s_{T1}}$$

are established. Eliminating $y_1$ in consideration of the above-mentioned constraint conditions on the input image 301 and the dolly zoom image regarding the image of the main subject yields:

$$s_{T1} = \frac{f_T}{f_w} s_{w1} \tag{4}$$

Hence, eliminating $s_{T1}$ from equations (3) and (4) yields:

$$\frac{y_{T2}}{y_{w2}} = \frac{f_T}{f_w} \frac{1}{\frac{s_{w1}}{s_{w2}}\left(\frac{f_T}{f_w} - 1\right) + 1} \tag{5}$$

When an enlargement ratio N of the background subject is determined by a user input, equation (5) is rewritten into:

$$f_T = \frac{N(1-D)}{1-ND} f_w \tag{6}$$

$$\left(N = \frac{y_{T2}}{y_{w2}}, D = \frac{s_{w1}}{s_{w2}}\right)$$

where D is the subject distance ratio. By using the relation of equation (4), equation (6) is rewritten into:

$$s_{T1} - s_{w1} = \frac{N-1}{1-ND} s_{w1} = t_3 \tag{7}$$

Figure 5A:
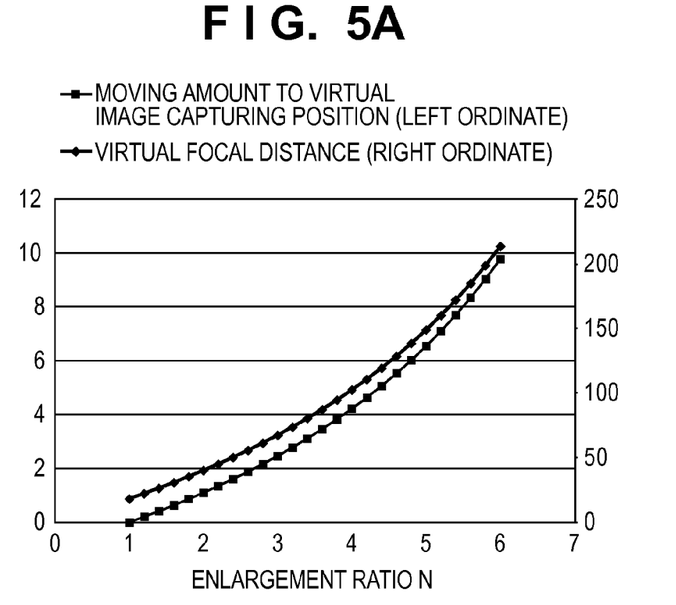
FIGS. 5A and 5B are graphs each showing the relationship between parameters regarding a designated condition and an image capturing condition corresponding to a dolly zoom image.

Even the moving amount $t_3$ of the virtual image capturing apparatus can be obtained. That is, if the enlargement ratio of the background subject is designated, the virtual focal distance $f_T$ and the moving amount $t_3$ from the image capturing position of the input image 301 to a virtual image capturing position, which are necessary parameters in equation (1), can be calculated. In other words, the deformation parameter calculation unit 107 can calculate deformation parameters based on equation (1) according to these pieces of information. FIG. 5A shows the relationship between the moving amount to the virtual image capturing position and the focal distance in accordance with the enlargement ratio N of the background subject. In FIG. 5A, the abscissa indicates the enlargement ratio N of the background subject, the ordinate on the left side indicates the moving amount from the image capturing position of the input image 301 to a virtual image capturing position, and the ordinate on the right side indicates the virtual focal distance.

Even when a plurality of background subjects exist, as shown in FIG. 3C, if the enlargement ratio of the image of the tree 324 at a deepest position is designated, the deformation parameter calculation unit 107 can specify a focal distance and an image capturing position of the virtual image capturing apparatus that correspond to the dolly zoom image. The deformation unit 103 can specify a position in the deformed background image 341 based on the specified parameters and the three-dimensional coordinates, centered on the image capturing apparatus, of another subject in the background region. The deformation unit 103 deforms the input background images 332a and 332b based on information of the specified position in the deformed background image 341, thereby generating the deformed background image 341.

<<Dolly Zoom Image Generation Processing>>

Figure 2:
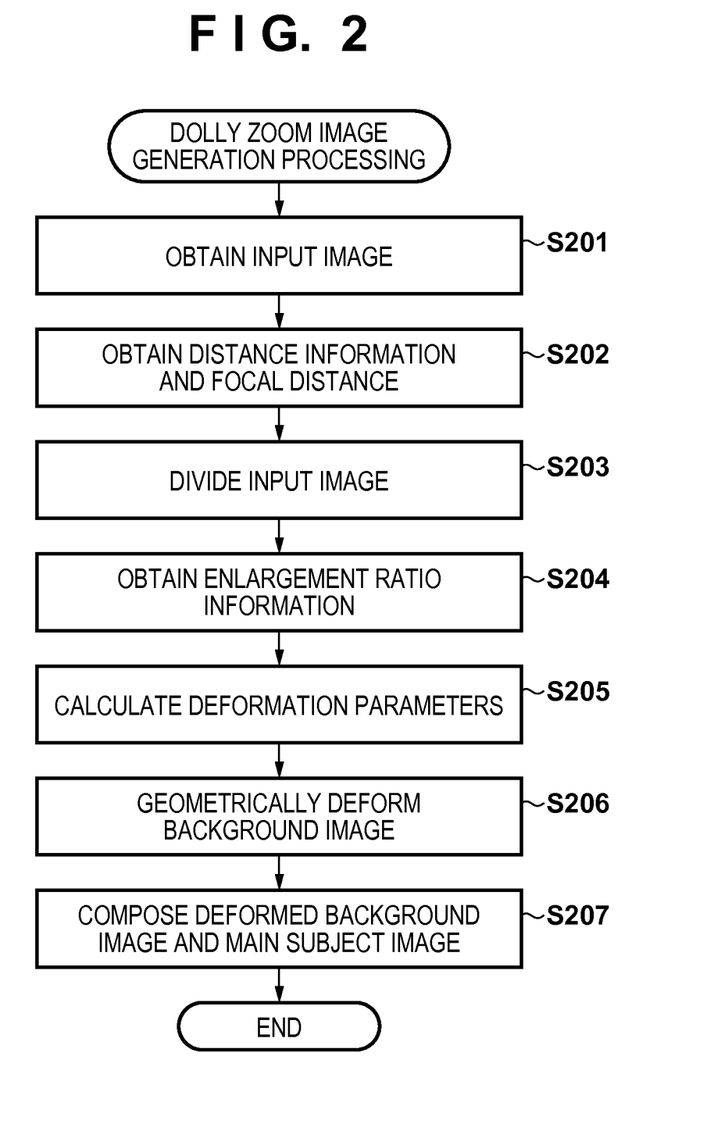
FIG. 2 is a flowchart exemplifying dolly zoom image generation processing according to the embodiment of the present invention.

As dolly zoom image generation processing to be performed by the PC 100 according to this embodiment based on the above-described principle, detailed processing will be explained with reference to the flowchart of FIG. 2. In the following description, the dolly zoom image generation processing starts when, for example, a captured image (input image) serving as a reference for generating a dolly zoom image is selected.

In step S201, the image input unit 101 obtains the selected input image from a recording medium (not shown). The image input unit 101 supplies the obtained input image to the region division unit 102.

In step S202, the information input unit 105 obtains distance information at the time of image capturing and information of a set focal distance, which correspond to the input image. The information input unit 105 supplies the obtained distance information to the region division unit 102, and supplies the distance information and the focal distance information to the deformation parameter calculation unit 107.

In step S203, the region division unit 102 divides the input image into a main subject image and a background image in accordance with the distance information. The region division unit 102 supplies the main subject image to the composition unit 104, and supplies the background image to the deformation unit 103.

In step S204, the condition setting unit 106 obtains enlargement ratio information representing an enlargement ratio in the dolly zoom image, which is designated by, for example, a user, for the image of a background subject at a deepest position included in the background region of the input image. The condition setting unit 106 transmits the obtained enlargement ratio information to the deformation parameter calculation unit 107.

In step S205, based on the enlargement ratio information, focal distance information, and distance information, the deformation parameter calculation unit 107 calculates a virtual focal distance, and a moving amount from the image capturing position of the input image to a virtual image capturing position, which are virtual image capturing conditions corresponding to the dolly zoom. The deformation parameter calculation unit 107 supplies the calculated deformation parameters to the deformation unit 103.

In step S206, the deformation unit 103 specifies the coordinates of each background subject in a deformed background image based on the deformation parameters and the three-dimensional coordinates, centered on the image capturing apparatus, of each background subject. Then, the deformation unit 103 deforms each background image in accordance with information of the specified coordinates, and composes each deformed background image in accordance with the positional relationship of the background subject, generating a deformed background image. The deformation unit 103 supplies the generated deformed background image to the composition unit 104.

In step S207, the composition unit 104 composes the main subject image and the deformed background image, generating and outputting a dolly zoom image.

As described above, the image processing apparatus according to this embodiment can generate, from an image obtained by image capturing, an image corresponding to virtual image capturing conditions different from those at the time of image capturing while maintaining the positional relationship between a main subject and a background subject in an image capturing environment. More specifically, the image processing apparatus obtains an input image acquired by image capturing, and classifies it into a main subject region and a background region. The image processing apparatus determines virtual image capturing conditions corresponding to an output image to be generated, based on the positional relationship between a main subject and a background subject in an image capturing environment when the input image was captured. The image processing apparatus deforms, of the input image, an image classified into the background region, and generates a background image of an output image that corresponds to the determined image capturing conditions. The image processing apparatus composes, of the input image, an image classified into the main subject region and the background image, generating an output image.

[Modification 1]

The above-described embodiment has explained the method of designating an enlargement ratio in a dolly zoom image to be generated, for the image of a background image included in the background region of an input image, thereby obtaining deformation parameters as virtual image capturing conditions corresponding to the dolly zoom image. However, information other than the enlargement ratio may be designated as a dolly zoom image generation condition in the practice of the present invention.

For example, even when the condition setting unit 106 obtains a virtual focal distance, a moving amount from the image capturing position of an input image to a virtual image capturing position can be specified using the above-described relations. More specifically, equation (4) is deformed into:

$$s_{T1} - s_{W1} = \left(\frac{f_T}{f_W} - 1\right)s_{W1} = t_3 \tag{8}$$

Figure 5B:
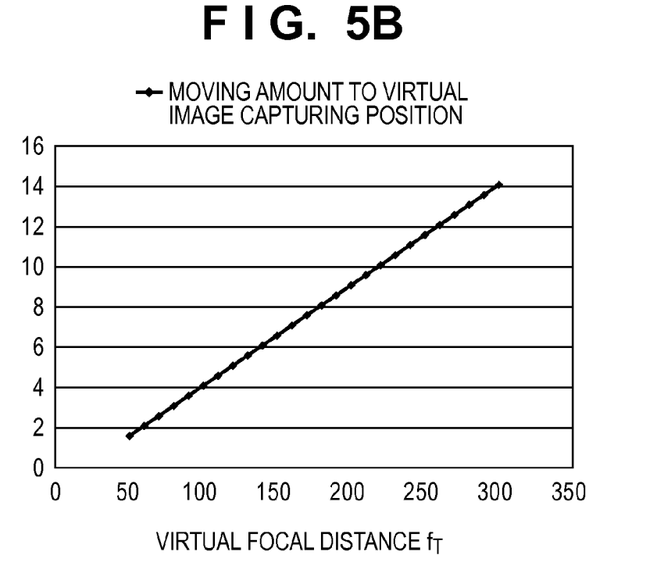

By using the designated virtual focal distance $f_T$, a moving amount to a virtual image capturing position can be specified. FIG. 5B shows the relationship of the moving amount to a virtual image capturing position in accordance with the virtual focal distance. In FIG. 5B, the abscissa indicates the virtual focal distance, and the ordinate indicates the moving amount from the image capturing position of an input image to a virtual image capturing position.

As is apparent from equation (8), even when a moving amount from the image capturing position of an input image to a virtual image capturing position or a virtual image capturing position is designated, a virtual focal distance can be specified.

In the practice of the present invention, deformation parameters can be calculated as long as information of at least one of a virtual image capturing position, a virtual focal distance, and the enlargement ratio of a predetermined background subject, which correspond to a dolly zoom image, is designated (information designation) as a virtual image capturing condition. Since a dolly zoom image can be generated by designating a virtual focal distance in this manner, "reflection" when different image capturing optical systems are used for the same main subject can be confirmed according to the present invention.

[Modification 2]

The above-described embodiment and modification have explained that an output image is a dolly zoom image in which the position and size of a main subject are the same as those in an input image. However, the practice of the present invention is not limited to this. For example, if information of the enlargement ratio of the image of a main subject in an output image is obtained, deformation parameters can be similarly calculated by changing, based on the information, a constraint condition regarding the size of the image of the main subject in the input image and the output image. In this case, the deformation unit 103 or the composition unit 104 generates the output image by performing processing of enlarging the image of the main subject.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-078235, filed Apr. 4, 2014, which is hereby incorporated by reference herein in its entirety.

What is claimed is:

1. An image processing apparatus comprising:
a processor; and
a memory storing instructions which, when executed by the processor, causes the processor to perform operations of the following units of the image processing apparatus:
an obtaining unit configured to obtain an input image acquired by image capturing;
a classification unit configured to classify the input image obtained by the obtaining unit into a main subject region and a background region;
a determination unit configured to determine virtual image capturing conditions corresponding to an output image to be generated, based on a positional relationship between a main subject and a subject of the background region in an image capturing environment when the input image was captured;
a generation unit configured to deform the background region of the input image, and generate a background image of the output image that corresponds to the virtual image capturing conditions determined by the determination unit; and
a composition unit configured to compose; the main subject region of the input image and the background image generated by the generation unit, thereby generating the output image.

2. The apparatus according to claim 1, wherein
the determination unit includes an information designation unit configured to designate information of at least one of an image capturing position, a focal distance, and an enlargement ratio of a predetermined background subject, which correspond to the output image, and
the determination unit determines the image capturing position and the focal distance which correspond to the output image, as the virtual image capturing conditions based on the information designated by the information designation unit, and the positional relationship in the image capturing environment.

3. The apparatus according to claim 2, wherein the generation unit generates the background image by coordinate transformation based on the focal distance, and a moving amount of an image capturing position corresponding to the output image from an image capturing position corresponding to the input image.

4. The apparatus according to claim 1, wherein
the classification unit classifies the input image into the main subject region and the background region based on information corresponding to distances of the subjects in the image capturing environment on a depth direction.

5. The apparatus according to claim 1, wherein
the generation unit generates the background image by deforming the background region of the input image based on distance information of the background region.

6. The apparatus according to claim 1, wherein
the classification unit performs the classification for the main subject region and the back ground region based on a distribution of defocus amounts obtained from a correlation relationship between a plurality of images.

7. The apparatus according to claim 1, wherein
the classification unit further classifies the background region of the input image into a plurality of regions of different depth ranges based on the positional relationship in the image capturing environment, and
the generation unit performs different deformations on each of the plurality of regions of the background region.

8. The apparatus according to claim 1, wherein
the composition unit composes the main subject region of the input image to make a position and size of the image in the output image be equal to a position and size of the image in the input image, and
the determination unit determines the virtual image capturing conditions based on conditions of the position and size of the main subject region of the input image in the output image.

9. The apparatus according to claim 1, wherein
the composition unit includes an enlargement ratio designation unit configured to designate a size of the main subject region of the input image,
the determination unit determines the virtual image capturing conditions based on the size of the main subject region of the input image that is designated by the enlargement ratio designation unit, and
the composition unit deforms the main subject region of the input image to have the size designated by the enlargement ratio designation unit, and composes the deformed image with the background image.

10. The apparatus according to claim 1, wherein the composition unit applies a low-pass filter to the background image based on the positional relationship in the image capturing environment, and composes the background image.

11. The apparatus according to claim 1, wherein the composition unit performs weighted addition composition of the main subject region of the input image and the background image in a peripheral region of a boundary of the main subject region.

12. A control method of an image processing apparatus comprising:
   an obtaining step of obtaining an input image acquired by image capturing;
   a classification step of classifying the input image obtained in the obtaining step into a main subject region and a background region;
   a determination step of determining virtual image capturing conditions corresponding to an output image to be generated, based on a positional relationship between a main subject and a subject of the background region in an image capturing environment when the input image was captured;
   a generation step of deforming the background region of the input image and generating a background image of the output image that corresponds to the virtual image capturing conditions determined in the determination step; and
   a composition step of composing the main subject region of the input image and the background image generated in the generation step, thereby generating the output image.

13. A non-transitory computer-readable recording medium recording a program for causing a computer to perform:
   obtaining an input image acquired by image capturing;
   classifying the input image into a main subject region and a background region;
   determining virtual image capturing conditions corresponding to an output image to be generated, based on a positional relationship between a main subject and a subject of the background region in an image capturing environment when the input image was captured;
   deforming the background region of the input image, and generating a background image of the output image that corresponds to the determined virtual image capturing conditions determined; and
   composing the main subject region of the input image and the generated background image, thereby generating the output image.

* * * * *